April 5, 1932. J. E. MYERS 1,852,852
HUMIDIFIER FOR INTERNAL COMBUSTION ENGINES
Filed May 19, 1927
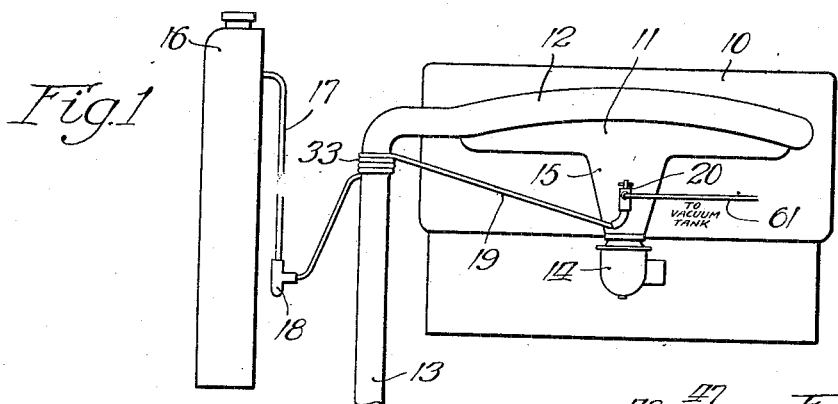
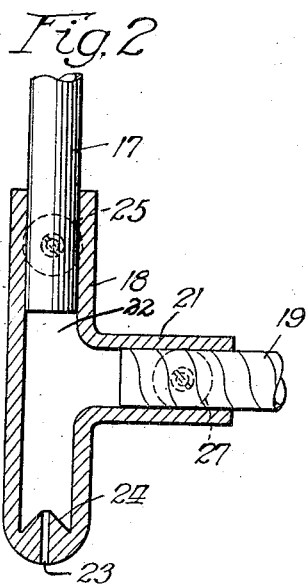
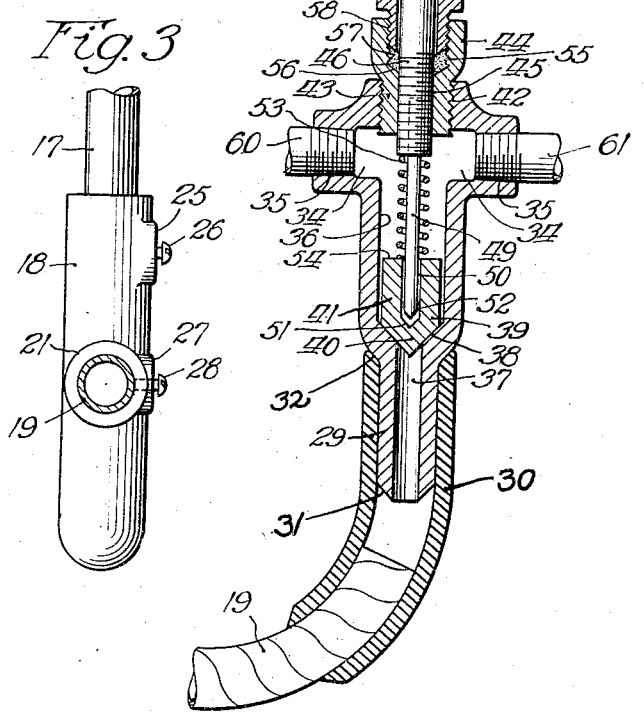
Inventor
John Edwin Myers
Alfred R. Fuchs Atty.

Patented Apr. 5, 1932

1,852,852

UNITED STATES PATENT OFFICE

JOHN EDWIN MYERS, OF LONG BEACH, CALIFORNIA

HUMIDIFIER FOR INTERNAL COMBUSTION ENGINES

Application filed May 19, 1927. Serial No. 192,692.

My invention relates to means for improving combustion in internal combustion engines and more particularly to humidifying means associated with the intake manifold of an internal combustion engine.

It is a purpose of my invention to provide means for introducing water vapor into the combustible mixture passing from the carburetor into the intake manifold of an internal combustion engine to thereby improve the combustion of said combustible mixture and, as a result of the more complete combustion thus obtained, to increase the amount of power obtainable from a predetermined quantity of gasoline or other fluid fuel and decrease the deposit of carbon otherwise resulting from the combustion thereof.

It is a further purpose of my invention to superheat said water vapor and to introduce the same at the most desirable point in the stream of combustible mixture flowing into the intake manifold. The superheating of said water vapor is accomplished by heating the same by means of the hot gases exhausted from the engine, and said water vapor is obtained from the radiator associated with said engine.

It is still another object of my invention to provide means for conducting the water vapor, obtained from the upper portion of the radiator to the intake manifold and superheating the same en route, that is simple to install and cheap to manufacture, said means comprising a flexible member for conducting the vapor from the radiator overflow pipe to the intake manifold, said flexible member being engaged with the exhaust manifold or exhaust pipe of the engine to heat the water vapor passing therethrough before the same reaches the intake manifold.

It is a further purpose of the invention to provide means for regulating the flow of said superheated vapor into the engine, comprising means connecting the flexible tubular member with the intake manifold, said means being provided with an adjustable valve member adapted to regulate the flow of water vapor therethrough and to entirely cut off the flow if desired.

It is also a purpose of my invention to provide new and improved means for connecting said flexible tubular member with the radiator overflow pipe, whereby the overflow from the radiator is not interfered with and whereby a trap is formed to retain some of the water therein, whereby air passing through the same will be humidified.

It is furthermore an object of my invention to provide a new and improved method and means for removing the carbon deposit from said engine without dismantling the same.

Other objects and advantages of the invention will appear as the description of the drawings proceeds. I desire to have it understood, however, that I do not intend to limit myself to the details of structure shown or described but that I intend to include as part of my invention all such obvious changes and modifications of parts as would occur to a person skilled in this art and as would fall within the scope of the claims.

In the drawings:

Fig. 1 is a view in side elevation of an internal combustion engine and associated parts showing my improved humidifying means applied thereto.

Fig. 2 is a longitudinal sectional view of the combined connector and trap member.

Fig. 3 is a vertical elevational view thereof, and

Fig. 4 is a vertical sectional view of the combined valve housing and connector member.

Referring in detail to the drawings my invention is shown as being applied to an internal combustion engine 10, having an intake manifold 11 and an exhaust manifold 12 from which the exhaust pipe 13 extends. The usual carbureter 14 is connected with the intake manifold 11 through the tapering passage 15. The engine is also provided with the radiator 16 having the overflow pipe 17.

My improved humidifying apparatus comprises a combined connector and trap member 18 secured to the lower end of the radiator overflow pipe 17, a flexible conduit 19 and a valve housing and connector member 20, leading into the intake manifold 11.

The combined connector and trap member 18 comprises a housing having a lateral tubular extension 21 connecting with the vertical passage 22 therein. The lower portion of the housing 18 is provided with a passage 23 of reduced diameter, and has a conical shoulder 24 at the junction of the passages 22 and 23 thus providing an annular groove in which water overflowing from the radiator may collect, providing a trap for some of said water. The housing is further provided with a boss 25 projecting laterally from the upper portion of said member having a screwthreaded opening with which the set screw 26 engages, said set screw acting to hold the portion of the overflow pipe 17 entering the passage 22 in proper position therein. The laterally projecting portion 21 is also provided with a boss 27 having a set screw 28 engaging in a screwthreaded opening therein and engaging the end portion of the flexible tubular member 19 entering said tubular extension 21 to hold the same in position.

The member 19 is preferably made of flexible metal tubing such as is well known and which is spirally wound out of sheet metal, being similar to the tubing used for metallic gas hose and flexible electrical conduits. The tubing 19 extends from the trap member 18 to the valve housing and connector member 20, being connected with the reduced tubular extension 29 thereon in any suitable manner, as by means of the rubber sleeve member 30 the ends of the members 29 and 30 being beveled at 31 and 32 respectively to aid in the application of the sleeve 30. The tubular member 19 is brought into contact with the means for conducting the exhaust gases from the engine between its point of connection with the member 18 and its point of connection with the member 20. The preferred way of doing this is shown in the drawings in which the flexible metal tube 19 is coiled around the exhaust pipe 13 a plurality of times so as to be in close contact with said exhaust pipe for a considerable length of said tube, the portion of the tubular member 19 coiled around the exhaust pipe being indicated by the numeral 33 in the drawings.

The member 20 serves both as a valve casing and as a connector member for connecting the tubular member 19 with the intake manifold of the engine. Said member 20 is provided with a chamber within the same to provide the aligned transverse passages 34 having the internal threads 35 and a longitudinal passage 36 intersecting the same. A passage 37 of reduced diameter aligns with the passage 36 and a beveled shoulder 38 is provided between said passages, said shoulder forming a valve seat. A valve member 39 is adapted to engage with said seat, said valve member having a conical end portion 40 co-operating with the seat to cut off communication between the passage 37 and the passage 36. The cylindrical rear portion 41 of said valve member has free sliding movement in the passage 36 and is guided in its movements by the wall of said passage.

The passage 36 extends through the end of the member 20 opposite the reduced tubular extension 29 and is provided with the internal screw threads 42 beyond the point of intersection of the passages 34 therewith. A shouldered sleeve 43 having external threads engaging with the threads 42 on the reduced portion thereof and being provided with a portion 44 of greater diameter having flattened outer faces for engagement with a tool such as a wrench, is provided, said sleeve 43 having an internally threaded portion 45 with which the threaded stem 46 of the valve adjusting member 47 having the cross bar 48 engages.

A valve stem 49 is mounted in the inner end of the threaded stem 46 and is loosely mounted in a socket 50 in the valve member 39, said socket being relatively deep and having a conical bottom 51 with which the tapered end 52 of the stem 49 is adapted to engage, to center the same. The stem 49 is embraced by a coiled spring 53 held under compression between the end of the stem portion 46 of the adjusting member 47 and the end 54 of the valve member 39. The spring thus tends to hold the valve member in engagement with its seat and the compression of said spring can obviously be adjusted by adjusting the position of the member 47 which can be readily turned for adjusting purposes by means of the cross bar 48.

In order to prevent turning of the member 47 out of adjusted position, the portion 44 of the sleeve 43 is provided with a socket portion 55 of larger diameter than the threaded passage 45, thus providing a bevelled shoulder 56 with which the gasket 57 of compressible material engages. The socket portion 55 is provided with internal threads 58 with which the packing nut 59 screwthreadedly engages to compress said gasket against the threads on the stem 46, thus holding said member 47 from turning.

A nipple 60 engages the threaded passage 34 on one side of the member 20 the other end of said nipple engaging with a threaded opening in the intake manifold. This opening may be tapped in the manifold if desired, but if the suction connection from the vacuum tank leads into said manifold near the point where the carbureter connects with the same, as in the arrangement shown in the drawings the threaded opening provided therefor is preferably utilized, the suction pipe 61 from the vacuum tank being merely detached from the intake manifold and the nipple 60 substituted therefor, and the suction pipe 61 being then connected with the threaded passage 34 opposite that to which the nipple 60 is connected. Thus the member 20 is interposed in the suction line to the vacuum tank without in any way interfering with the same, as the passages 34 are always open and connected with each other.

A very important feature of the invention is the provision of an arrangement whereby the invention can be readily applied to an internal combustion engine at small cost and without any complicated procedure in installing the same. It will be obvious that no changes in the engine itself nor the usual exhaust conducting means are necessary for the installation of the device, and that the same is adapted for use on all engines of the internal combustion type having a radiator without the necessity of providing for any interchange of or variation in the parts, as the device is absolutely standard in construction for all such engines and sufficient flexible tubing may be provided for installation in any motor car, as all that is necessary is to connect the member 18 with the radiator overflow pipe, then wind around or otherwise engage the flexible member 19 with the exhaust gas conducting means at any convenient point, preferably at a higher level than said member 18, and then attach the member 20 to the intake manifold at such a point that the vaporized moisture will mingle with the stream of explosive mixture passing into said manifold from the carbureter. This is done by interposing the member 20 in the suction line of the vacuum tank whenever convenient in the manner pointed out above.

It will be evident that with the adjustment of the member 47 in the proper position the valve member 39 will leave its seat with each suction stroke of the engine drawing water vapor which has previously been superheated into the intake manifold and that the amount of opening of said valve member 39 can be adjusted to any desired degree by operation of the adjusting member 47. In fact said member 47 can be adjusted so that the end 52 of member 49 will engage the bottom 51 of the socket to hold said valve so that the valve 39 will not leave its seat at all, thus completely shutting off the superheated water vapor. After installation of the device the member 47 is adjusted so as to obtain the most desirable proportion of water vapor to get the most perfect combustion and after such an adjustment is obtained the carbureter is adjusted so as to reduce the amount of fuel introduced into the engine with each suction stroke. It has been found that by the use of my invention the amount of fuel used can be very materially reduced in view of the more perfect combustion obtained and the deposit of carbon also materially reduced because of such improvement in combustion.

It will be noted that the member 30 can be readily removed from the member 29 and replaced in position. By removing the member 30 and placing a receptacle containing kerosene in such position that the end of the tube 29 extends into the same, the kerosene will be drawn into the engine as the same rotates, with each suction stroke. This loosens the carbon deposit, which will be blown out through the exhaust pipe upon further operation of the engine.

Having thus described my invention what I desire to claim and secure by United States Letters Patent is:

1. The combination with an internal combustion engine having an intake manifold and a chamber containing water vapor, of means for conducting air containing water vapor to said manifold, comprising a tubular member, a member having a check valve therein connecting one end of said tubular member with said intake manifold and means connecting the other end of said tubular member with said chamber, comprising a member open to the outer air and having a trap for water adjacent the opening therein leading to the outer air.

2. The combination with an internal combustion engine having an intake manifold, and a radiator having an overflow pipe, of a tubular member leading from said overflow pipe to said manifold, a trap member open to the outer air connecting the end of said overflow pipe with said tubular member, said tubular member opening into said trap member at a point spaced materially above the opening to the outer air and a member having an adjustable check valve therein connecting said tubular member with said intake manifold.

3. The combination with an internal combustion engine having an intake manifold, and a radiator having an overflow pipe, of a tubular member leading from said overflow pipe to said manifold, a member having water trapping means therein and open to the outer air connecting said overflow pipe with said tubular member above the water level in said trapping means and a member having an adjustable check valve therein connecting said tubular member with said intake manifold.

4. The combination with an internal combustion engine having an intake manifold, a conduit for exhaust gases, and a radiator provided with an overflow pipe, of means for conducting humidified air from said overflow pipe to said intake manifold without interfering with the discharge of water through said overflow pipe and heating said air en route to said manifold, comprising a tube engaging said conduit, a chambered connector engaging said overflow pipe and having passages leading to said tube and to the outer air and a member having an adjustable check valve therein connecting said tube with said intake manifold.

5. The combination with an internal combustion engine having an intake manifold, a conduit for exhaust gases, and a radiator provided with an overflow pipe, of means for conducting humidified air from said overflow pipe to said intake manifold without interfering with the discharge of water through said overflow pipe and heating said air enroute to said manifold, comprising a flexible tube embracing said conduit, a chambered connector engaging said overflow pipe and having passages leading to said tube and to the outer air and a member having an adjustable check valve therein connecting said tube with said intake manifold.

6. The combination with an internal combustion engine having an intake manifold and a radiator provided with an overflow pipe, of means for conducting humidified air from said overflow pipe to said intake manifold without interfering with the discharge of water through said overflow pipe, comprising a tube, a chambered connector engaging said overflow pipe and having passages leading to said tube and to the outer air and a member having an adjustable check valve therein connecting with said tube with said intake manifold, said chambered connector having a trap therein.

7. In a humidifier for an internal combustion engine having an intake manifold, a controlling member having a hollow body portion provided with a longitudinal bore having an offset therein near one end thereof providing a valve seat, a lateral outlet communicating with said bore and with said intake manifold, a valve member co-operating with said seat, resilient means urging said valve member toward said seat, means for adjusting said resilient means and means for positively holding said adjusting means in adjusted position.

8. In a humidifier for an internal combustion engine having an intake manifold, a controlling member having a hollow body portion provided with a longitudinal bore having an offset therein near one end thereof providing a valve seat, a traverse passage intersecting said bore and with said intake manifold, a valve member cooperating with said seat, resilient means urging said valve member toward said seat, means for adjusting said resilient means extending from said body portion on the opposite end thereof from said valve seat, means for positively holding said adjusting means in adjusted position and means for positively limiting the movement of said valve off its seat.

9. In a humidifier for an internal combustion engine having an intake manifold, a controlling member having a hollow body portion provided with a longitudinal bore having an offset therein near one end thereof providing a valve seat, a transverse passage intersecting said bore and with said intake manifold, a valve member co-operating with said seat, resilient means urging said valve member toward said seat, means for adjusting said resilient means and means for positively holding said adjusting means in adjusted position, said body portion being reduced in external diameter on the end thereof having said valve seat to provide means for slipping a tube onto or off the same.

10. A humidifier for an internal combustion engine having an intake manifold, a member having a hollow body portion provided with a longitudinal bore having an offset therein near one end thereof providing a valve seat, a lateral outlet communicating with said bore and with said intake manifold, a valve member co-operating with said seat, resilient means urging said valve member toward said seat, and means for positively limiting the movement of said valve off its seat.

11. The combination with an intake manifold and a radiator overflow pipe, of a member having a hollow body portion provided with a longitudinal bore having an offset therein near one end thereof providing a valve seat, a lateral outlet communicating with said bore and with said manifold, a valve member co-operating with said seat, resilient means urging said valve member toward said seat, said body portion being externally reduced at the end thereof having said valve seat, a flexible tubular member quick detachably connected therewith, and a three-way connector secured to said overflow pipe and to the end of said flexible tubular member opposite said first member, said connector having a trap portion.

In testimony whereof I hereunto subscribe my name this 10th day of May, 1927.

JOHN EDWIN MYERS.